United States Patent
Gaulard et al.

(10) Patent No.: US 9,563,989 B2
(45) Date of Patent: Feb. 7, 2017

(54) SYSTEM AND METHOD FOR MAINTAINING AN AIRCRAFT ENGINE

(71) Applicant: SNECMA, Paris (FR)

(72) Inventors: Jean-Philippe Daniel Gaulard, Vaires-sur-Marne (FR); Fabrice Harand, Boissise-la-Bertrand (FR); Salomon Serfaty, St Maur des Fosses (FR); Kevin Laplace Denouail, Corbeil Essonnes (FR); Samuel Lerouge, Combs la Ville (FR); Gabriel Mouilhade, Evry (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/689,962

(22) Filed: Apr. 17, 2015

(65) Prior Publication Data

US 2016/0307377 A1    Oct. 20, 2016

(51) Int. Cl.

| G07C 5/00 | (2006.01) |
| G07C 5/08 | (2006.01) |
| F01D 5/06 | (2006.01) |
| F01D 5/12 | (2006.01) |
| F01D 25/16 | (2006.01) |
| B64D 27/10 | (2006.01) |

(52) U.S. Cl.
CPC ............ *G07C 5/0808* (2013.01); *B64D 27/10* (2013.01); *F01D 5/06* (2013.01); *F01D 5/12* (2013.01); *F01D 25/16* (2013.01); *G07C 5/006* (2013.01); *G07C 5/008* (2013.01); *G07C 5/085* (2013.01); *F05D 2220/323* (2013.01); *F05D 2260/82* (2013.01)

(58) Field of Classification Search
CPC combination set(s) only.
See application file for complete search history.

(56) References Cited

U.S. PATENT DOCUMENTS

| 5,088,285 | A | * | 2/1992 | Stevenson | ................. F01B 1/12 123/65 BA |
| 6,122,575 | A | * | 9/2000 | Schmidt | .............. G06F 11/2252 244/1 R |
| 7,308,614 | B2 | * | 12/2007 | Kojori | ................ G05B 23/0289 701/33.8 |
| 7,560,920 | B1 | * | 7/2009 | Ouyang | ............... G01N 27/902 324/240 |
| 8,914,205 | B2 | * | 12/2014 | Chandran | ............... G06F 17/00 701/31.4 |
| 2004/0225474 | A1 | * | 11/2004 | Goldfine | ............ G01N 27/9046 702/183 |
| 2012/0283963 | A1 | * | 11/2012 | Mitchell | ................. F01D 17/02 702/34 |
| 2013/0020430 | A1 | * | 1/2013 | Cox | ....................... B64C 25/405 244/50 |
| 2013/0112807 | A1 | * | 5/2013 | Cox | ........................ B64C 25/36 244/50 |

* cited by examiner

*Primary Examiner* — Yonel Beaulieu
(74) *Attorney, Agent, or Firm* — Oblon, McClelland, Maier & Neustadt, L.L.P.

(57) ABSTRACT

A method and system that includes an aircraft engine that includes high pressure turbine blades, low pressure turbine blades, and a plurality of bearings, a data logging device associated with the aircraft engine to acquire engine data of the aircraft engine, and an external device that is external to the data logging device. The external device of the system includes processing circuitry to assign a failure coverage cycle to the aircraft engine.

3 Claims, 6 Drawing Sheets

SYSTEM AND METHOD FOR MAINTAINING AN AIRCRAFT ENGINE

BACKGROUND

A company's finances may be severely affected when high and unexpected repair costs of items directly related to their business operations arise. This is especially true for airline companies when aircraft engines malfunction or breakdown. Such high repair costs can lead to an airline's operations being suspended or even terminated. This is especially true for mid-size airline companies (for example, less than 30 airplanes) that may not have the necessary funds available to cover such high and unexpected repair costs.

SUMMARY

A method and system that includes an aircraft engine that includes high pressure turbine blades, low pressure turbine blades, and a plurality of bearings, a data logging device associated with the aircraft engine and configured to acquire engine data of the aircraft engine, and an external device that is external to the data logging device. The external device including processing circuitry configured to calculate a risk of domestic object damage for the aircraft engine based on the engine data of the aircraft engine acquired from the data logging device via a communication network, wherein the engine data include a record of past failures, a record of repairs of the aircraft engine, a record of operating environment of the aircraft engine, and a record of operating hours of the aircraft engine, identify a scope and period of a failure coverage cycle based on the calculated risk of domestic object damage for the aircraft engine, wherein the scope of the failure coverage cycle is limited to domestic object damage occurring in the aircraft engine, and the period of the failure coverage cycle corresponds to initiation and termination of the failure coverage cycle, determine eligibility of the aircraft engine for the scope and the period of the failure coverage cycle based on the calculated risk of domestic object damage for the aircraft engine, calculate an economic basis for the failure coverage cycle based on the engine data of the aircraft engine acquired from the data logging device, the scope of the failure coverage cycle, and the period of the failure coverage cycle, and assign the failure coverage cycle to the aircraft engine based on the calculated risk of the domestic object damage for the aircraft engine and the economic basis for the failure coverage cycle.

BRIEF DESCRIPTION OF THE DRAWINGS

The disclosure will be better understood from reading the description which follows and from examining the accompanying figures. These figures are provided solely as non-limiting examples of the embodiments. In the drawings.

DETAILED DESCRIPTION

Figure 1:
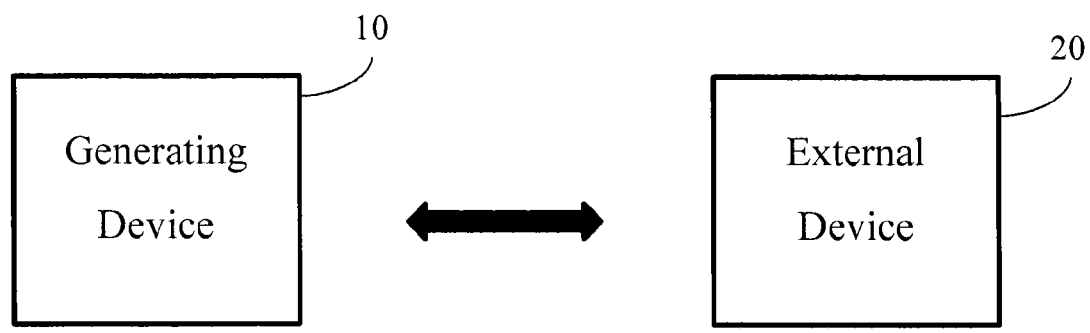
FIG. 1 illustrates a generating device and an external device.

The disclosed embodiments discuss a system, method, device, and non-transitory computer-readable storage medium for maintaining an aircraft engine.

In one embodiment, the system comprises an aircraft engine that includes high pressure turbine blades, low pressure turbine blades, and a plurality of bearings; a data logging device associated with the aircraft engine and configured to acquire engine data of the aircraft engine; and an external device that is external to the data logging device, the external device including processing circuitry configured to calculate a risk of domestic object damage for the aircraft engine based on the engine data of the aircraft engine acquired from the data logging device via a communication network, wherein the engine data include a record of past failures, a record of repairs of the aircraft engine, a record of operating environment of the aircraft engine, and a record of operating hours of the aircraft engine, identify a scope and period of a failure coverage cycle based on the calculated risk of domestic object damage for the aircraft engine, wherein the scope of the failure coverage cycle is limited to domestic object damage occurring in the aircraft engine, and the period of the failure coverage cycle corresponds to initiation and termination of the failure coverage cycle, determine eligibility of the aircraft engine for the scope and the period of the failure coverage cycle based on the calculated risk of domestic object damage for the aircraft engine, calculate an economic basis for the failure coverage cycle based on the engine data of the aircraft engine acquired from the data logging device, the scope of the failure coverage cycle, and the period of the failure coverage cycle, and assign the failure coverage cycle to the aircraft engine based on the calculated risk of the domestic object damage for the aircraft engine and the economic basis for the failure coverage cycle.

In one embodiment, the processing circuitry is further configured to generate an agreement for the failure coverage cycle, wherein the generated agreement includes the assigned failure coverage cycle, the economic basis for the failure coverage cycle, and a serial number of the aircraft engine.

In one embodiment, the system further comprises a display device, wherein the processing circuitry is further configured to generate, before assigning the failure coverage cycle, a recommendation indicating the calculated economic basis for the failure coverage and the scope and the period of the failure coverage cycle, and display the generated recommendation via a graphical user interface on the display device.

In one embodiment, the method comprises calculating a risk of domestic object damage for the aircraft engine based on engine data of the aircraft engine, wherein the engine data include a record of past failures, a record of repairs of the aircraft engine, a record of operating environment of the aircraft engine, and a record of operating hours of the aircraft engine; identifying a scope and period of a failure coverage cycle based on the calculated risk of domestic object damage for the aircraft engine, wherein the scope of the failure coverage cycle is limited to domestic object damage occurring in the aircraft engine, and the period of the failure coverage cycle corresponds to initiation and termination of the failure coverage cycle; determining eligibility of the aircraft engine for the scope and the period of the failure coverage cycle based on the calculated risk of domestic object damage for the aircraft engine; calculating an economic basis for the failure coverage cycle based on the engine data of the aircraft engine, the scope of the failure coverage cycle, and the period of the failure coverage cycle; and assigning the failure coverage cycle to the aircraft engine based on the calculated risk of the domestic object damage for the aircraft engine and the economic basis for the failure coverage cycle.

In one embodiment, the method further comprises determining items to associate with the failure coverage cycle based on the engine data of the aircraft engine, wherein the determined items include a requirement to report operation changes of the aircraft engine during the failure coverage cycle.

In one embodiment, the determined items include a requirement to perform preventative maintenance on the aircraft engine during the failure coverage cycle.

In one embodiment, the determined items include a requirement that in event of failure of the aircraft engine during the failure coverage cycle, an investigation is to be performed to confirm whether a root cause of the failure of the aircraft engine is one of root causes within the scope of the failure coverage cycle.

In one embodiment, the determined items include an indication that the root causes within the scope of the failure coverage cycle include high pressure turbine blades, low pressure turbine blades, and bearings.

In one embodiment, the method further comprises generating an agreement for the failure coverage cycle, wherein the generated agreement includes the assigned failure coverage cycle, the economic basis for the failure coverage cycle, the determined items, and a serial number of the aircraft engine.

In one embodiment, the method further comprises dispatching, in response to the failure of the aircraft engine during the failure coverage cycle, an engine analyzer to a location of the aircraft engine to perform the investigation to confirm whether the root cause of the failure of the aircraft engine is one of the root causes within the scope of the failure coverage cycle.

In one embodiment, the method further comprises instructing repair of the aircraft engine in response to the investigation determining that the root cause of the failure of the aircraft engine is one of the root causes within the scope of the failure coverage cycle.

In one embodiment, the method further comprises generating, before the assigning, a recommendation indicating the calculated economic basis for the failure coverage and the scope and the period of the failure coverage cycle.

In one embodiment, the method further comprises displaying the generated recommendation via a graphical user interface.

In one embodiment, the method further comprises receiving an input, via the graphical user interface, to modify at least one of the calculated economic basis for the failure coverage and the scope and the period of the failure coverage cycle, and modifying the at least one of the calculated economic basis for the failure coverage and the scope and the period of the failure coverage cycle based on the received input.

In one embodiment, the method comprises receiving information of failure of an aircraft engine; dispatching an engine analyzer to a location of the aircraft engine to perform a preliminary determination whether a root cause of the failure of the aircraft engine is encompassed by a failure coverage cycle; receiving a second determination of the root cause of the failure of the aircraft engine from an aircraft analyzer, in response to the preliminary determination, to thereby determine a final root cause of the failure of the aircraft engine; and communicating the second determination over a communications network.

In one embodiment, the method further comprises estimating a repair cost of the aircraft engine, in response to the second determination indicating that the root cause of the failure of the aircraft engine is encompassed by the failure coverage cycle.

In one embodiment, the method further comprises searching for another aircraft engine that is equivalent to the aircraft engine, in response to the second determination indicating that the root cause of the failure of the aircraft engine is encompassed by the failure coverage cycle; and performing, using the estimated repair cost, a cost benefit analysis to determine whether it is beneficial to replace the aircraft engine with the another aircraft engine or to repair the aircraft engine, in response to the searching finding the another aircraft engine.

In one embodiment, the method further comprises instructing the repair of the aircraft engine in response to the searching not finding the another aircraft engine or in response to the cost benefit analysis determining it is beneficial to repair the aircraft engine.

In one embodiment, the method further comprises transmitting over the communications network a proposal to replace the aircraft engine with the another aircraft engine, in response to the cost benefit analysis determining it is beneficial to replace the aircraft engine with the another aircraft engine.

In one embodiment, the device comprises processing circuitry configured to calculate a risk of domestic object damage for the aircraft engine based on engine data of the aircraft engine, wherein the engine data include a record of past failures, a record of repairs of the aircraft engine, a record of operating environment of the aircraft engine, and a record of operating hours of the aircraft engine, identify a scope and period of a failure coverage cycle based on the calculated risk of domestic object damage for the aircraft engine, wherein the scope of the failure coverage cycle is limited to domestic object damage occurring in the aircraft engine, and the period of the failure coverage cycle corresponds to initiation and termination of the failure coverage cycle, determine eligibility of the aircraft engine for the scope and the period of the failure coverage cycle based on the calculated risk of domestic object damage for the aircraft engine, calculate an economic basis for the failure coverage cycle based on the engine data of the aircraft engine acquired from the data logging device, the scope of the failure coverage cycle, and the period of the failure coverage cycle, and assign the failure coverage cycle to the aircraft engine based on the calculated risk of the domestic object damage for the aircraft engine and the economic basis for the failure coverage cycle.

In one embodiment, the non-transitory computer-readable storage medium includes computer executable instructions, wherein the instructions, when executed by a computer, cause the computer to perform a method, the method comprising calculating a risk of domestic object damage for the aircraft engine based on engine data of the aircraft engine, wherein the engine data include a record of past failures, a record of repairs of the aircraft engine, a record of operating environment of the aircraft engine, and a record of operating hours of the aircraft engine; identifying a scope and period of a failure coverage cycle based on the calculated risk of domestic object damage for the aircraft engine, wherein the scope of the failure coverage cycle is limited to domestic object damage occurring in the aircraft engine, and the period of the failure coverage cycle corresponds to initiation and termination of the failure coverage cycle; determining eligibility of the aircraft engine for the scope and the period of the failure coverage cycle based on the calculated risk of domestic object damage for the aircraft engine; calculating an economic basis for the failure coverage cycle based on the engine data of the aircraft engine, the scope of the failure coverage cycle, and the period of the failure coverage cycle; and assigning the failure coverage cycle to the aircraft engine based on the calculated risk of the domestic object damage for the aircraft engine and the economic basis for the failure coverage cycle.

A commercial aircraft (for example, an airplane) and its engines are operated by airline companies. Typically, the airline companies enter into contracts with maintenance companies that provide maintenance and repair for the engines.

In one embodiment of the present disclosure, a solution is presented in which an airline company enters into a contract/agreement with a coverage-providing entity that provides specific coverage for the engine. In one embodiment, such coverage-providing entity may be, for example, a maintenance company as discussed above.

In one embodiment, the solution may be geared toward mid-size airline companies (less than 30 airplanes, and preferably less than 10) equipped with, for example, high-bypass turbofan aircraft engines with a thrust range of 18,000 to 34,000 pounds-force (80 to 150 kilonewtons). The CFM56 engines are an example of such engines, and the solution may be geared toward airline companies equipped with, for example, CFM56-5B and CFM56-7B engines. In one embodiment, the solution may also be geared to civil or military air forces or very important person (VIP) aircrafts.

The solution discussed herein offers the airline company (hereinafter "customer") a contract/agreement in which the coverage-providing entity (hereinafter "entity") covers engine repairs in the entity's own shop or shop of the entity's choosing, until a financial ceiling is reached that is defined in the contract/agreement. Under such agreement, the repairs will be covered under the condition that the assessment by the entity confirms that engine failure is the result of technical criteria that are covered under a High Cost Failure (HCF) coverage. In one embodiment, such coverage may include, for example, failure of blades (such as High Pressure Turbine (HPT) blades and Low Pressure Turbine (LPT) blades), and bearings (such as Bearings No. 3, and Bearings No. 4). Coverage includes complete or partial financial reimbursement for costs and/or fees incurred to repair or replace damaged and/or defective parts, and/or the cost of labor needed to complete a repair.

Note that Bearings No. 3 and No. 4 are specific to the design of CFM56 engines. However, it is to be understood that such coverage may apply to any bearing (or any other part), regardless of the design of a particular engine. By way of background, a jet engine includes a main shaft and one or more spool(s). The shaft and the spool(s) rotate at different speeds and need to be "beared" from and between the engine frame. This is performed through the use of bearings. As can be imagined, a failure of these bearings (in particular, Bearings No. 3 and No. 4 in the CFM design) leads to severe damage to the other parts of the engine.

If the failure is not covered by HCF coverage, the entity will offer to the customer to repair the engine under "Time & Material" conditions that represent conditions of the agreement between the customer and the entity. Under such conditions, the customer agrees to pay the entity based upon the work performed and for the materials used in the repair.

The root causes of unscheduled and high cost engine failure may be classified into two categories. The first category is Foreign Object Damage (FOD) and refers to any damage to the engine caused by objects which are not part of the engine (i.e., stones, debris, birds, etc.). FODs are typically covered by aircraft insurance.

The second category is Domestic Object Damage (DOD) and refers to any damage to the engine caused by objects which are part of the engine. Typically, DODs are included in Rate Per Flight Hour (RPFH) contracts, but are limited to a Beyond Economical Repair amount (i.e., the cost of necessary repair is higher than the remaining value of the engine).

Typically, there is no coverage for repairs due to DODs. There is a need to provide coverage for DOD repairs, for at least the following reasons. First, with such coverage, customers do not have to worry about managing unscheduled repairs. Second, customers do not have to maintain a high monetary reserve for unscheduled repairs and can thus have more resources and working capital to pay for operations and for investment purposes, etc. Under such DOD coverage, customers simply have to make a fixed payment periodically during the coverage period and have peace of mind in case of such unscheduled DOD repairs.

Third, such DOD coverage benefits customers with complex administrative processes who may find it worthwhile to pay predictable and quantifiable fees periodically instead of paying a very high amount of money for a shop visit or repair/replacement after the failure of an engine.

Fourth, such coverage also benefits the coverage-providing entity because it keeps customers' aircrafts flying, minimizes customers' debts, provides more options to customers via such service, and maintains a stream of revenue.

FIG. 1 illustrates an agreement generating device 10 and another external device 20. The device 10 is located at the entity or is under the control of the entity. The external device 20 may be another device of the entity or may be a device located at the customer or under the control of the customer.

It is to be understood that there may be a plurality of each of these aforementioned devices. Each of the devices in FIG. 1 may communicate with each other (as is shown by the arrows) via one or more networks (for example, a local area network (LAN) and/or another communications network, such as the Internet). Each of the devices in FIG. 1 may also communicate with other devices (not shown) such as, but not limited to, servers, databases, mobile devices, etc.

Each of the device 10 and the device 20 may be a server, computer system, personal computer (PC), laptop, netbook, etc. Each of the device 10 and the device 20 may include the configuration shown in FIG. 6.

Figure 2:
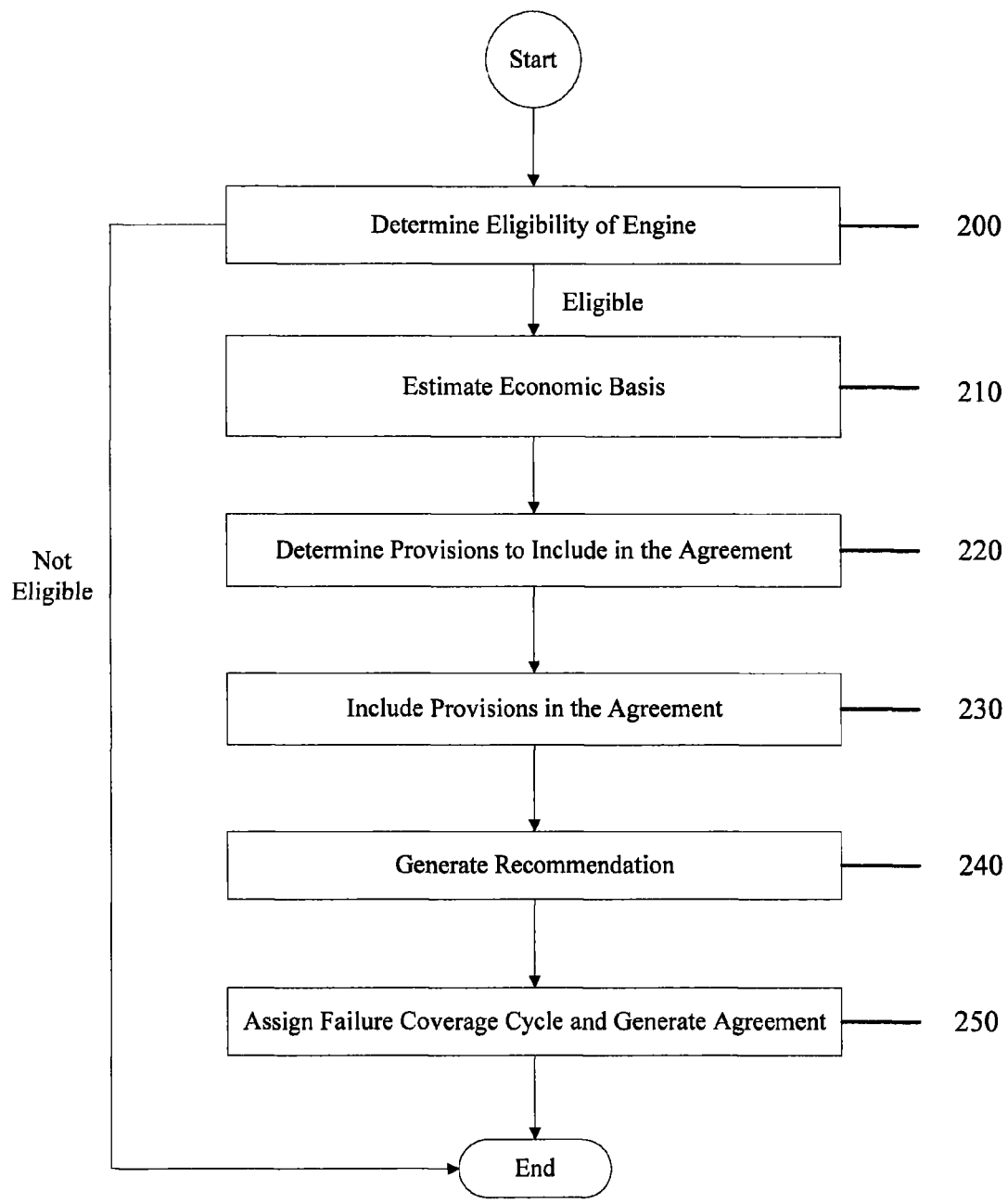
FIG. 2 illustrates a flowchart for a process of generating an agreement according to one embodiment.

FIG. 2 is a flowchart illustrating a process for generating an agreement/contract between the entity and the customer, according to one embodiment. Note that the process illustrated in FIG. 2 is performed by the generating device 10. The process of FIG. 2 may be initiated by the device 10 upon a request from a device of the customer (for example, device 20) to evaluate whether a particular engine is eligible for high cost failure coverage.

At step 200, the agreement generating device 10 determines whether to offer high cost failure coverage to a particular engine. The goal of the entity at this step is to select a "good" or "reasonable" risk (i.e., an engine with a good maintenance record, therefore a low probability of failing). First, the device 10 acquires a serial number of the engine. Second, the device 10 acquires technical data of the engine using the serial number of the engine. In one embodiment, such data may be acquired from a memory or database that stores such data. The memory or database may be at the device 10 or external to the device 10. In one embodiment, such data may be obtained from the engine itself, which may be configured to collect and transmit data to the device 10, the device 20, or any other device.

Further, in one embodiment, engines may be equipped with a data logging device and various sensors/devices. Note that the data logging device may include the configuration shown in FIG. 6. Further, the sensors/devices may be installed on/in the engine when the engine is built, when the engine is brought in for service, or at any other time. In one embodiment, the sensors/devices may include, but are not limited to, pressure sensor(s), temperature sensor(s), engine failure sensor(s), speed sensor(s), accelerometer(s), Global Positioning System (GPS), or the like.

In one embodiment, data from the various sensors/devices may be gathered by the data logging device (for example, in real time or at any other time), and sent (periodically at a set date and time or upon request) to the memory/database/devices discussed above. In one embodiment, a device (such as device 10 or device 20) may request data from the various sensors/devices. In one embodiment, this request may be sent, for example, by the device 10 to the data logging device at step 200 (i.e., when determining the eligibility of the particular engine). In one embodiment, this data may already be stored at the memory or database. In one embodiment, the data may be read remotely, wirelessly, or in-person.

The acquired engine data may provide information on past failures such as the type of shop visits for past failures (service history), operating environment (i.e., has the engine been used to fly over seas, land, desert, etc.) and operational condition of the engine, maintenance facilities, and ownership history. In one embodiment, examples of an operational condition of the engine include, but are not limited to: 1) flight in sand, dust, marine salt; 2) average duration of flight in flight hours (from take-off to landing); 3) average altitude; and 4) average number of yearly flying hours.

In one embodiment, the data may include the data (pressure data, temperature data, speed data, accelerometer data, GPS location data, etc.) collected from the various sensors/devices located at the engine. Note that since this data is gathered directly via the data logging device, this data is unaltered and thus more reliable than data, for example, reported by the customer or any other entity.

In addition, the data may include the age of the engine, the engine technical history measured in operating hours or cycles since the last shop visit, the number of shop visits, and the potential remaining life for each of a plurality of Life Limited Parts (LLPs). LLPs are set forth in 14 CFR §33.70 of the U.S. Code of Federal Regulations. LLPs are governed by the number of flight hours or flight cycles. Note that, LLPs are rotor and major static structural parts whose primary failure is likely to result in a hazardous engine effect. Typically, engine LLPs include, but are not limited to, disks, spacers, hubs, shafts, high-pressure casings, and non-redundant mount components.

Next, the device 10 generates, using the engine data, statistical failure models, providing information regarding the cumulated probability of failure as a function of the number of hours on wing. Statistical failure models may use Weibull distributions, which are suitable for modeling the life of an engine, and capable of reproducing the behavior of other probability laws. In addition, other simulations may be used such as, but not limited to, Monte Carlo simulations.

At step 200, the device 10 calculates a score indicating the risk that the engine will fail over a predetermined period of time using one or more of the above-discussed models. At step 200, the device 10 also identifies a scope and period of a failure coverage cycle, based on the calculated risk. In one embodiment, the scope may be limited to DOD. In one embodiment, the scope may not be limited to only DOD, but include other type of damage.

The period of the failure coverage cycle corresponds to initiation and termination of the failure coverage cycle. In one embodiment, the initiation and termination of the failure coverage cycle may be a period suggested by the customer based on the customer's own needs. For example, the customer may decide it would like a five-year coverage period for the engine because that is when the lease on the engine expires. In one embodiment, the failure coverage cycle may be a predetermined period (for example, three years) determined by the coverage-providing entity.

Based on the calculated risk, the device 10 determines whether the engine is eligible for the scope and the period of the failure coverage cycle. In one embodiment, this determination may be performed by comparing the calculated score to a threshold score. In one embodiment, the determination may be performed by calculating a plurality of scores indicating the risk that the engine will fail over a plurality of periods of time, and comparing these scores to various thresholds. For example, the risk that the engine will fail over the next three years may be very low, the risk that the engine will fail in the three years following the initial first three years may be higher, and the risk that the engine will fail in the following three years may be much higher, and so forth.

Based on the above, the device 10 may, for example, determine that the engine is eligible for the aforementioned (three-year or five-year) cycle, determine that the engine is not eligible for the aforementioned (three-year or five-year) cycle, determine that the engine is not eligible for the aforementioned (three-year or five-year) cycle, but is eligible for a different cycle (for example, a one-year or two-year cycle), or determine that the engine is not eligible at all (i.e., for any cycle).

If the device 10 determines that the engine is eligible, then the process proceeds to step 210. At step 210, the device 10 calculates an economic basis (for example, a price) for the failure coverage cycle. The price may be a factor of the risk of failure of the engine. For example, the price may be a first amount if the risk of failure is relatively low, whereas the price may be a higher second amount if the risk of failure is higher. The price may also depend on the environment in which the engine will be used, the number of hours it will be used (either per flight or over a given period of time), or a combination of the two. For example, the harsher the environment the higher the price; the longer the number of hours the higher the price.

Next, at step 220, the device 10 determines which provisions to include in the agreement/contract. Some or all of the provisions may be stored in a memory or a database and accessed by the device 10. In other words, the device may determine which provision to include and then select it from the database to be included in the final agreement.

The determination at step 220 is based on the various acquired data related to the engine as well as the environment and the number of hours of usage. For example, if the particular engine is to be used in harsher environments and/or presents a higher risk of failure, the device 10 may include a provision requiring the customer to perform more preventive maintenance on the engine or have more frequent shop visits. The device 10 may also include a provision requiring more frequent reporting on the condition of the engine to the entity. Such "more frequent" reporting may be daily, weekly, monthly, or yearly. Furthermore, such "more frequent" reporting may also be in real time (i.e., the condition of the engine may be reported to the entity in real time, for example, during operation of the engine, while on the ground, or while maintenance is being performed).

In one embodiment, another provision may indicate that only costs directly associated by HCF are included. In other words, costs of wear and tear not associated with the event are excluded. In one embodiment, one provision may indicate that, in case of an engine failure, the entity is to perform an investigation to confirm whether the root cause of the engine failure is one of the root causes included in the coverage. As noted above, in one embodiment, the root causes covered under the high cost failure coverage for a CFM56 engine include the HPT blade, the LPT blade, Bearing #3, and Bearing #4. Note that, in one embodiment, the aforementioned are the only root causes covered under the high cost failure coverage. However, in one embodiment, there may be additional root causes or root causes other than HPT blade, the LPT blade, Bearing #3, and Bearing #4 covered under the high cost failure coverage.

In one embodiment, one provision may indicate that if it has been confirmed that the root cause of the engine failure is covered, then the entity is to perform the repair of the engine (for example, in the entity's shop or shop authorized by the entity) at no charge for the customer, at a preset fraction of the cost of repair, and/or up to an amount agreed upon in the contract. Note that this amount is also included as a provision by the device 10, and may be different depending on the particular engine. In one embodiment, another standard provision that may be included in the contract/agreement is that the entity may also propose a Standard Exchange of the engine instead of repair (i.e., exchange the engine with an equivalent engine).

In one embodiment, another provision may detail the failure coverage cycle/contract duration discussed above. A standard cycle is three years and may be renewed up to fifteen years. However, in one embodiment, the contract may be of a different duration and may be renewed for a longer period of time. Further, there may also be a provision indicating that a yearly escalation and updating of fees is required each time the contract is renewed.

Note that the coverage cycle/renewing of the coverage cycle may be selected/adjusted by the device 10 based on the acquired data relating to the engine as well as the environment and the number of hours of usage. For example, the initial cycle for an engine that is determined to have a very low risk of failure in the next seven years may be longer (for example, six years) than the contract duration for an engine that is likely to fail in four years.

Furthermore, in one embodiment, there may be a provision requiring that all technical information related to the engine (for example, engine characteristics, previous shop visit reports, applied service bulletins, etc.) be communicated by the customer to the entity. In one embodiment, there may be a provision also requiring fees from the customer due to technical gaps of engines, as well as requiring the customer to pay other fees. Note that, in one embodiment, technical gaps refer to modifications that the entity has introduced since delivery/last shop visit of the engines and which therefore would not have been implemented on the engine. An example of such modification may be providing, as an option, parts with a special coating offering a better resistance to harsh environment.

Next, in one embodiment, there may be a provision requiring the customer to strictly follow the recommendations of the entity and service bulletins during the duration of the coverage cycle. In one embodiment, the customer may be required to declare any significant operations change (for example, environment, route, use, flight leg, etc.). In one embodiment, the customer may be required to strictly respect maintenance manuals (for example, Aircraft Maintenance Manual (AMM), Engine Shop Manual (ESM), etc.).

In one embodiment, another provision may be included that indicates that if there is an error in maintenance or operation of the engine, the coverage does not apply. In such case, the entity would perform its analysis to determine whether such error occurred.

Furthermore, in order to properly identify the respective engine that is being covered, the serial number of the engine is included in the contract/agreement. Thus, in one embodiment, only the engine with the serial number included in the contract will be covered, and the coverage will not be transferable to any other engine.

In one embodiment, the device 10 may also include a provision indicating that during shop visits, Parts Manufacturer Approval (PMA)/Designated Engineering Representative (DER) parts are to be systematically removed and replaced by Original Equipment Manufacturer (OEM) parts, and these OEM parts are to be invoiced to the customer (for example, at Time & Material conditions). Thus, under the high cost failure coverage, if the customer had at a point in time replaced OEM parts with non-OEM parts, those non-OEM parts will be replaced back with OEM parts (in accordance with the normal replacement schedule for the respective part) and the customer will pay for this out-of-pocket. Note that PMA parts include non-OEM parts (i.e., after-market parts), and DER parts include used/refurbished parts.

In one embodiment, the device 10 may also include a provision indicating that all investigations/inspections performed by the entity into the engine failure that result in a determination that the root cause of such failure is not covered by the high cost failure coverage, are to be paid by the customer. Examples of such investigations/inspections are discussed in more detail below, with respect to FIGS. 3 and 4.

In one embodiment, the device 10 may also include a provision indicating that LLPs that are not related to the high cost failure event (i.e., the event that caused the engine failure) are to be replaced and invoiced to the customer at Time & Material conditions.

In one embodiment, the device 10 may also include a provision indicating that defects due to normal wear and tear are to be repaired and invoiced to the customer at Time & Material conditions. Hence, in one embodiment, only the high coverage failure event repair cost is to be paid by the entity.

In one embodiment, the device 10 may also include a provision indicating that FODs are not included in the high cost failure coverage. Hence, under this provision, only DODs are included in the high cost failure coverage.

Next, at step 230, the device 10 includes the provisions determined at step 220 in the agreement. Note that these provisions may be all or any combination of the above-discussed provisions as well as other provisions/information that are customarily included in a contract/agreement.

Next, at step 240, the device 10 generates a recommendation based on the above-discussed steps. This recommendation may be displayed on a display (such as display 1210 shown below in FIG. 6), via a graphical user interface (GUI), such that a user can review/approve the recommendation. For example, the recommendation may recite that this particular engine has a low risk of failure and, as a result, the price should be a specific amount and the term of the contract should be for a certain number of years (for example, four years in this particular case instead of the standard three).

Note that the recommendation may vary from engine to engine depending on the reliability of the engine/risk of failure. For example, a recommendation for an engine that has a higher risk of failure may include a shorter contract duration, a higher price, and stricter provisions.

At step 240, the user has the opportunity to make any changes to the recommendation via the GUI. For example, the user may agree with all of the information in the recommendation except for the price. Accordingly, the user may modify the price by performing an input (for example, using keyboard 1211 and/or pointing device 1212 and/or display 1210 (if a touch panel display), shown below in FIG. 6) to the device 10. Note that the user may modify any or all of the provisions/information included in the recommendation. Once the user is satisfied with the above-discussed provisions, the user confirms this via an input (for example, by clicking on an "OK" or "Finish" button on the user interface).

Then, the device 10 assigns the failure coverage cycle to the engine and generates the agreement/contract at step 250. In one embodiment, at step 250, the entire contract/agreement is generated including not only the information discussed above but also other contractual language/terms that are customarily included in contracts of this nature. Thus, in one embodiment, the contract generated at step 250 is a full contract that is ready to be executed by the customer and the entity.

In one embodiment, once the contract/agreement is generated, the contract/agreement may be reviewed in its entirety by the entity's legal department to ensure all the details/information/provisions/terms are accurate. In one embodiment, once this review is complete, the device 10 may then send (for example, electronically) the high cost failure contract/agreement to the customer to be executed. Upon execution of the contract by the parties, the contract becomes an enforceable contract.

Having the above-discussed steps performed by the device 10 provides certain advantages. For example, the device 10 is able to collect a multitude of data and analyze such data to make the best informed decision whether to extend coverage to a particular engine. Due to its computational power, the device 10 is able to quickly and effectively analyze all data and determine which provisions are most appropriate to be included in the agreement in each particular case. Performing the above-discussed steps also improves the functioning of the device 10 itself as processing power is efficiently used. Further, by having the device 10 perform the aforementioned steps (as opposed to a human), human error may be substantially eliminated.

Figure 3:
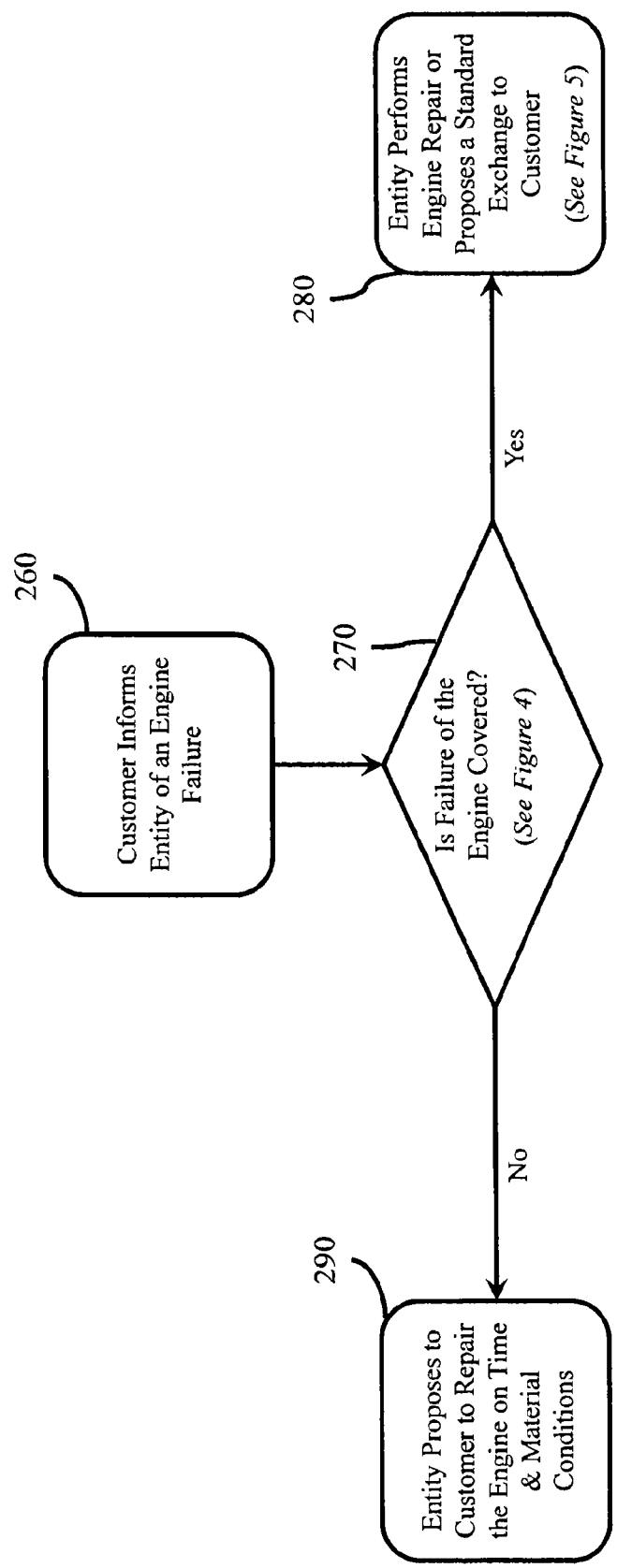
FIG. 3 illustrates a flowchart of a process performed after the agreement has been generated and executed.

FIG. 3 illustrates a flowchart of a process performed after the failure coverage agreement has been generated and executed by the parties. Note that the process of FIG. 3 may be performed at any time during the duration of the agreement, when there is an engine failure for an engine covered under the high cost failure coverage.

First, at step 260, the customer informs the entity of the failure of an engine. Next, at step 270, the entity performs a process to determine whether the failure of the engine is covered under the high cost failure coverage. This process is detailed below with reference to FIG. 4.

If it is determined, at step 270, that the failure of the engine is covered by the high cost failure coverage ("YES"), the process proceeds to step 280. At step 280, the entity performs engine repair or proposes and engine standard exchange to customer. This process is detailed below with reference to FIG. 5.

On the other hand, if it is determined, at step 270, that the failure of the engine is not covered by the high cost failure coverage ("NO"), the process proceeds to step 290. At step 290, the entity proposes to the customer to repair the engine on Time & Material conditions (at customer's own cost).

Figure 4:
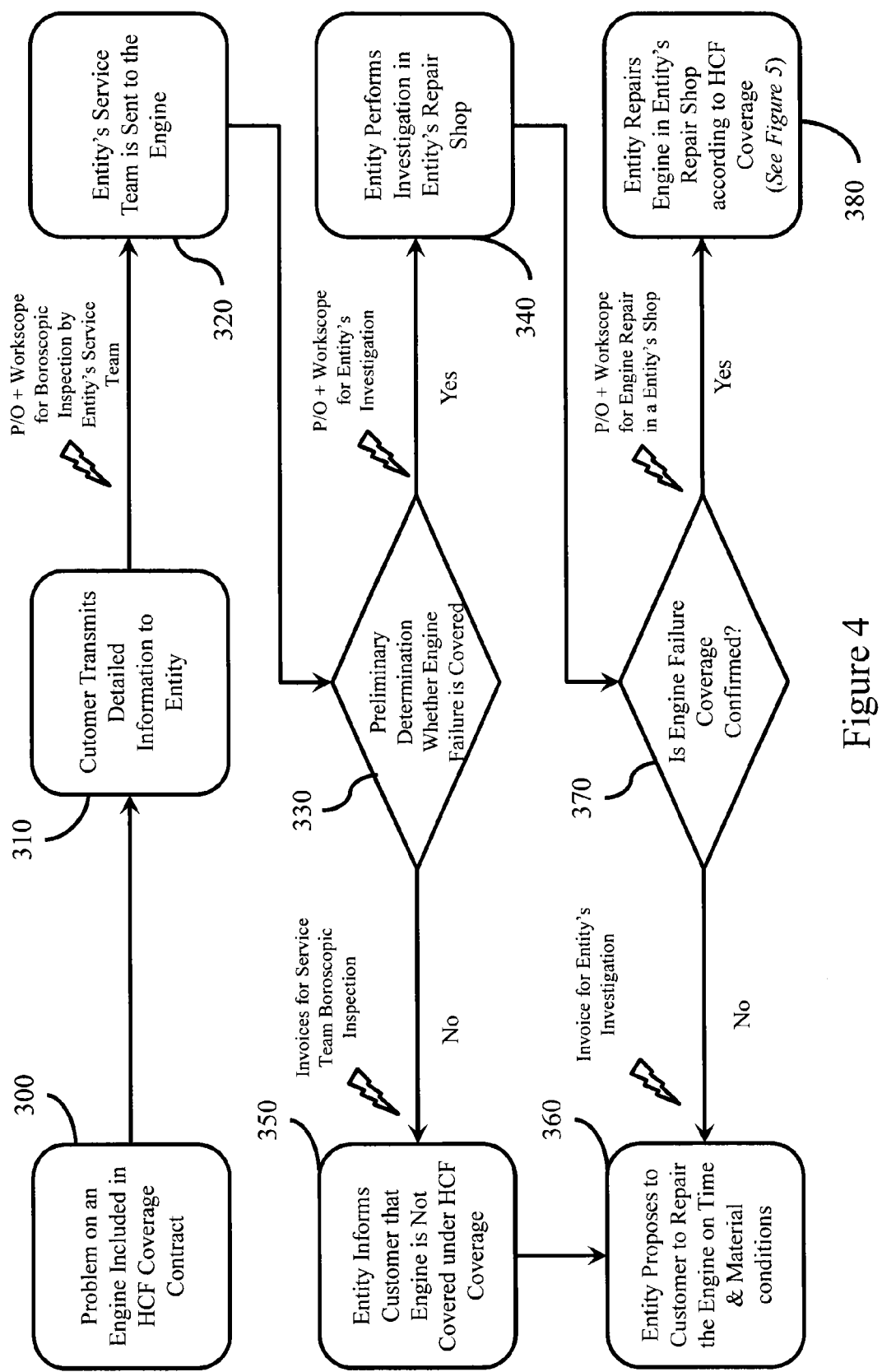
FIG. 4 illustrates a flowchart for a process performed when there is an issue with an engine, according to one embodiment.

FIG. 4 illustrates a flowchart detailing the process performed when there is a problem/malfunction with an engine that is covered by the high cost failure coverage (after the failure coverage agreement has been generated and executed by the parties), according to one embodiment. At step 300, it is determined that there is a problem with the engine. Next, at step 310, the customer transmits detailed information of the issue to the coverage-providing entity, and the entity issues a Purchase Order (P/O) for inspection (for example, a boroscopic inspection) by the entity's service team. At step 320, the team is dispatched to the location of the engine to investigate the issue.

Next, at step 330, the service team makes a preliminary determination whether the engine failure is covered under the high cost failure coverage by performing the inspection. This may be a determination of the root cause of the malfunction of the engine. In one embodiment, a visual inspection (including using a borescope) by the service team generally provides a good idea of the scope of repair. By visual inspection, the service team may make a preliminary determination, for example, that blades and vanes appear to be damaged.

If it is determined at step 330 that the engine is covered, then a P/O is issued, and the engine is delivered to the entity for additional investigation in the entity's repair shop.

However, if it is determined at step 330 that the engine is not covered, then an invoice for the inspection carried out by the service team is issued and customer is informed, at step 350, that the root cause of failure of the engine was determined not to be covered under the high cost failure coverage. Then, at step 360, the entity proposes to the customer to repair the engine on Time & Material conditions.

Returning to step 340, once the investigation in the repair shop has been performed, the entity confirms, at step 370, whether the root cause of failure of the engine is covered under the high cost failure coverage. If it is determined that the engine is covered, then a P/O is issued for engine repair at the entity's repair shop and the repair is carried out at step 380.

However, if it is determined that the engine is not covered, then an invoice for the investigation carried out at step 340 is issued to the customer and, at step 360, the entity proposes to the customer to repair the engine on Time & Material conditions.

Figure 5:
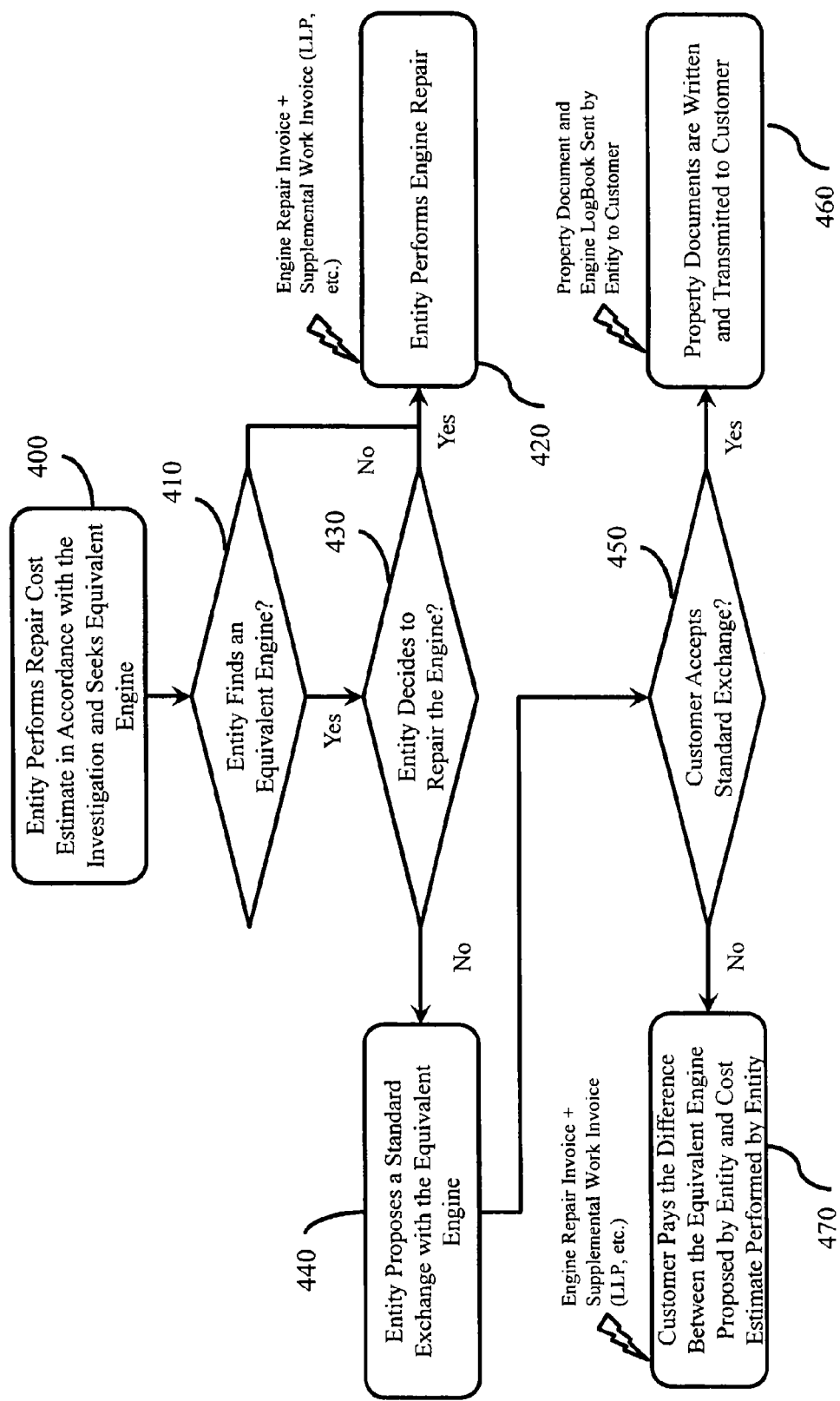
FIG. 5 illustrates a flowchart for a process of repair cost estimation and seeking an equivalent engine, according to one embodiment.

FIG. 5 illustrates a flowchart detailing the process performed after it has been determined that entity will repair the engine at step 380. At step 400, the entity performs a repair cost estimate based on the preliminary investigation and also seeks an equivalent engine. At step 410, it is determined whether an equivalent engine has been found. If an equivalent engine is not found, then the entity repairs the engine, at step 420, and prepares an invoice for the repair and an invoice for supplemental work, if any. In one embodiment, supplemental work corresponds to modification and upgrades, as well as optional parts that may be outlined in the agreement with the customer, which are not necessarily mandatory to restore the engine but may be worth repairing and/or replacing.

On the other hand, if an equivalent engine is found at step 410, then at step 430 it is decided whether to repair the engine. The decision at step 430 is based on, for example, a cost benefit analysis to determine whether it is worth repairing the damaged engine or whether it is more cost efficient to replace the engine with the equivalent engine.

If it is decided at step 430 to repair the engine, then the process proceeds to step 420 and the engine is repaired. When it is decided to repair the engine, a nondestructive inspection of the engine may be performed by dismounting or disassembling the engine. On disassembly, which is necessary to repair the engine, additional costs may be found.

If it is decided at step 430 not to repair the engine, the process then proceeds to step 440 and the entity proposes to the customer a Standard Exchange with the equivalent engine. At step 450, a decision is received from the customer indicating whether the proposed Standard Exchange is acceptable.

If the Standard Exchange is accepted by the customer, then at step 460 the entity generates the property documents and a set of documents showing a log of the main characteristics of the engine (such as, flight hours, cycles, and LLPs accumulated hours and cycles) for the equivalent engine and sends the documents to the customer. Note that the property documents are a set of documents to acknowledge that a transfer of engine property occurred, such as invoices, bill of sales, and Acceptance Certificate. However, if the Standard Exchange is not accepted by the customer, then at step 470 the customer is invoiced to pay the difference between the equivalent engine proposed by the entity and the repair cost estimate determined at step 400.

Figure 6:
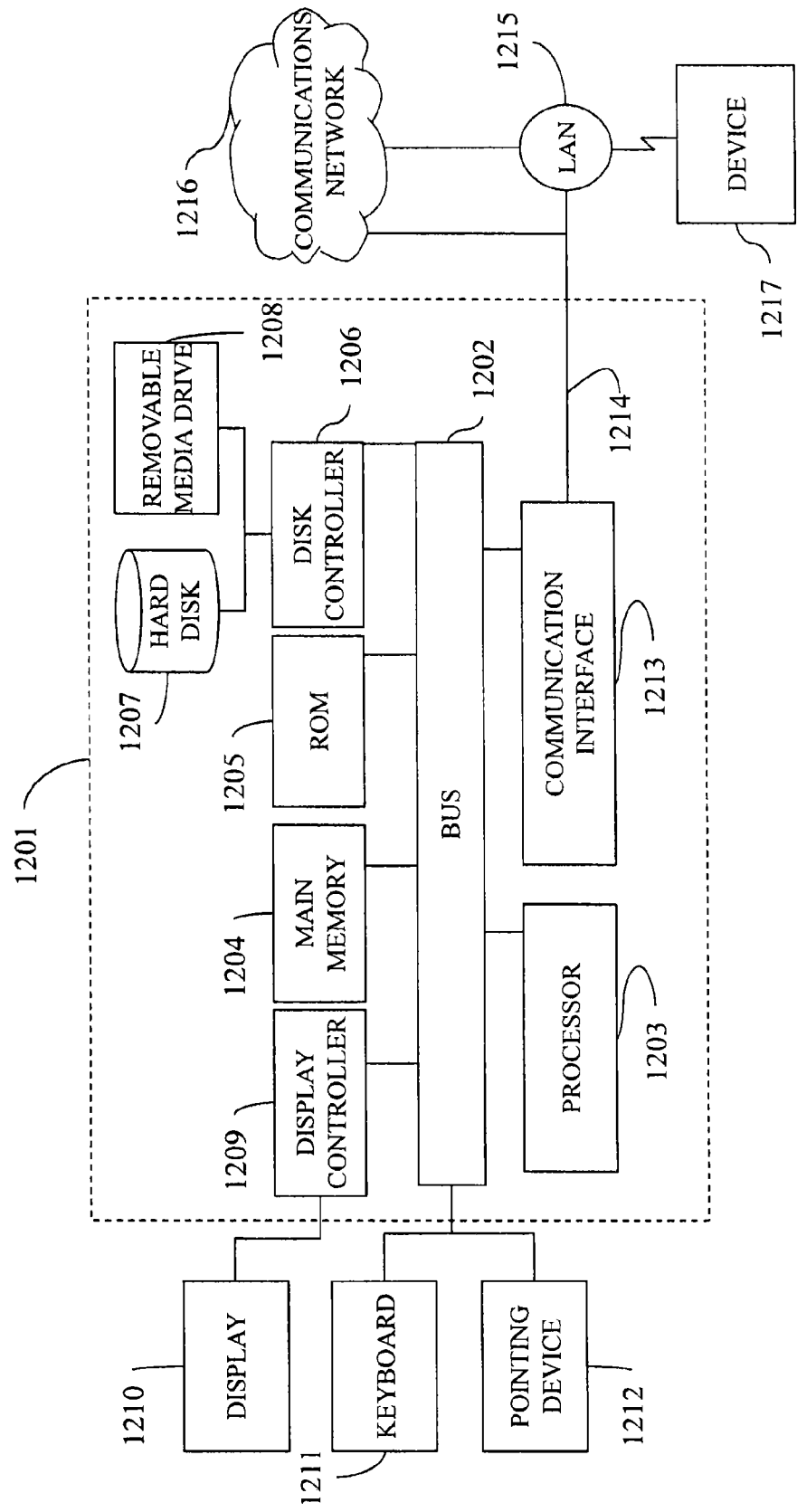
FIG. 6 illustrates a computer system upon which embodiment(s) of the present disclosure may be implemented.

Note that the processes performed in FIGS. 3-5 above, may be performed using various devices (for example, a device at the customer and a device at the coverage-providing entity). In one embodiment, each of these devices has a configuration as shown in FIG. 6.

Note that the high cost failure coverage discussed herein is different from a warranty. Typically, a warranty is offered for limited hours of flying (e.g., 6000 hours maximum) and/or for a particular number of years from delivery, after which coverage for repair is no longer available or only available subject to uneconomic conditions. On the other hand, the high cost failure coverage extends for a contractually agreed-upon term of flying hours.

Moreover, a typical warranty is directed to brand new engine delivery (New Engine Warranty) or new spare parts (New Part Warranty), or may be a repair engine warranty (Repair Engine), and does not cover all the costs, for example, for disassembly/assembly of the parts under warranty, and FOD. Beyond this typical warranty coverage, the customer will typically bear the costs of maintaining the engine (for example, performance restoration, FOD, and DOD).

High cost failure coverage is also different from Beyond Economical Repair schemes. In particular, Beyond Economical Repair is based on non-technical economic criteria (i.e., if the price of the engine repair is higher than the value of an equivalent engine on the market, the engine is beyond economical repair). On the other hand, high cost failure is based on technical criteria (i.e., engine failure root cause must be included in the engine failure root cause of the coverage).

Each of the functions/methods/processes described in the embodiments may be implemented by one or more processing circuits (or circuitry). For example, the process illustrated in FIG. 2 may be implemented by one or more processing circuits (or circuitry). A processing circuit includes a programmed processor (for example, processor 1203 of FIG. 6), as a processor includes circuitry. A processing circuit also includes devices such as an application specific integrated circuit (ASIC) and conventional circuit components arranged to perform the recited functions.

FIG. 6 illustrates a computer system 1201 upon which embodiment(s) of the present disclosure may be implemented. As noted above, device 10 and device 20 each have a configuration as shown in FIG. 6. The computer system 1201 may be a general-purpose computer or a particular, special-purpose machine. In one embodiment, the computer system 1201 becomes a particular, special-purpose machine when the processor 1203 is programmed to provide failure coverage for an aircraft engine.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., ASICs) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, which may be a liquid crystal display (LCD), for displaying information to a computer user. Note that display 1210 may also be a touch panel display. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to an electronic device 1217 (for example, device 20 in FIG. 1).

It must be noted that the various elements, features and processes described herein may be used independently of one another, or may be combined in various ways. All possible combinations and subcombinations are intended to fall within the scope of this disclosure. Further, nothing in the present disclosure is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

The invention claimed is:

1. A system, comprising:
an aircraft engine that includes high pressure turbine blades, low pressure turbine blades, and a plurality of bearings;
a data logging device associated with the aircraft engine and configured to acquire engine data of the aircraft engine; and
an external device that is external to the data logging device, the external device including processing circuitry configured to
calculate a risk of domestic object damage for the aircraft engine based on the engine data of the aircraft engine acquired from the data logging device via a communication network, wherein the engine data include a record of past failures, a record of repairs of the aircraft engine, a record of operating environment of the aircraft engine, and a record of operating hours of the aircraft engine,
identify a scope and period of a failure coverage cycle based on the calculated risk of domestic object damage for the aircraft engine, wherein the scope of the failure coverage cycle is limited to domestic object damage occurring in the aircraft engine, and the period of the failure coverage cycle corresponds to initiation and termination of the failure coverage cycle,
determine eligibility of the aircraft engine for the scope and the period of the failure coverage cycle based on the calculated risk of domestic object damage for the aircraft engine,
calculate an economic basis for the failure coverage cycle based on the engine data of the aircraft engine acquired from the data logging device, the scope of the failure coverage cycle, and the period of the failure coverage cycle, and
assign the failure coverage cycle to the aircraft engine based on the calculated risk of the domestic object damage for the aircraft engine and the economic basis for the failure coverage cycle.

2. The system according to claim 1, wherein the processing circuitry is further configured to generate an agreement for the failure coverage cycle, wherein the generated agreement includes the assigned failure coverage cycle, the economic basis for the failure coverage cycle, and a serial number of the aircraft engine.

3. The system according to claim 1, further comprising:
a display device, wherein
the processing circuitry is further configured to
generate, before assigning the failure coverage cycle, a recommendation indicating the calculated economic basis for the failure coverage and the scope and the period of the failure coverage cycle, and
display the generated recommendation via a graphical user interface on the display device.

* * * * *